INVENTORS:
CARL R. ECKARDT
WILLIAM M. BUNGO
BY
Robert A. Harman
ATTORNEY

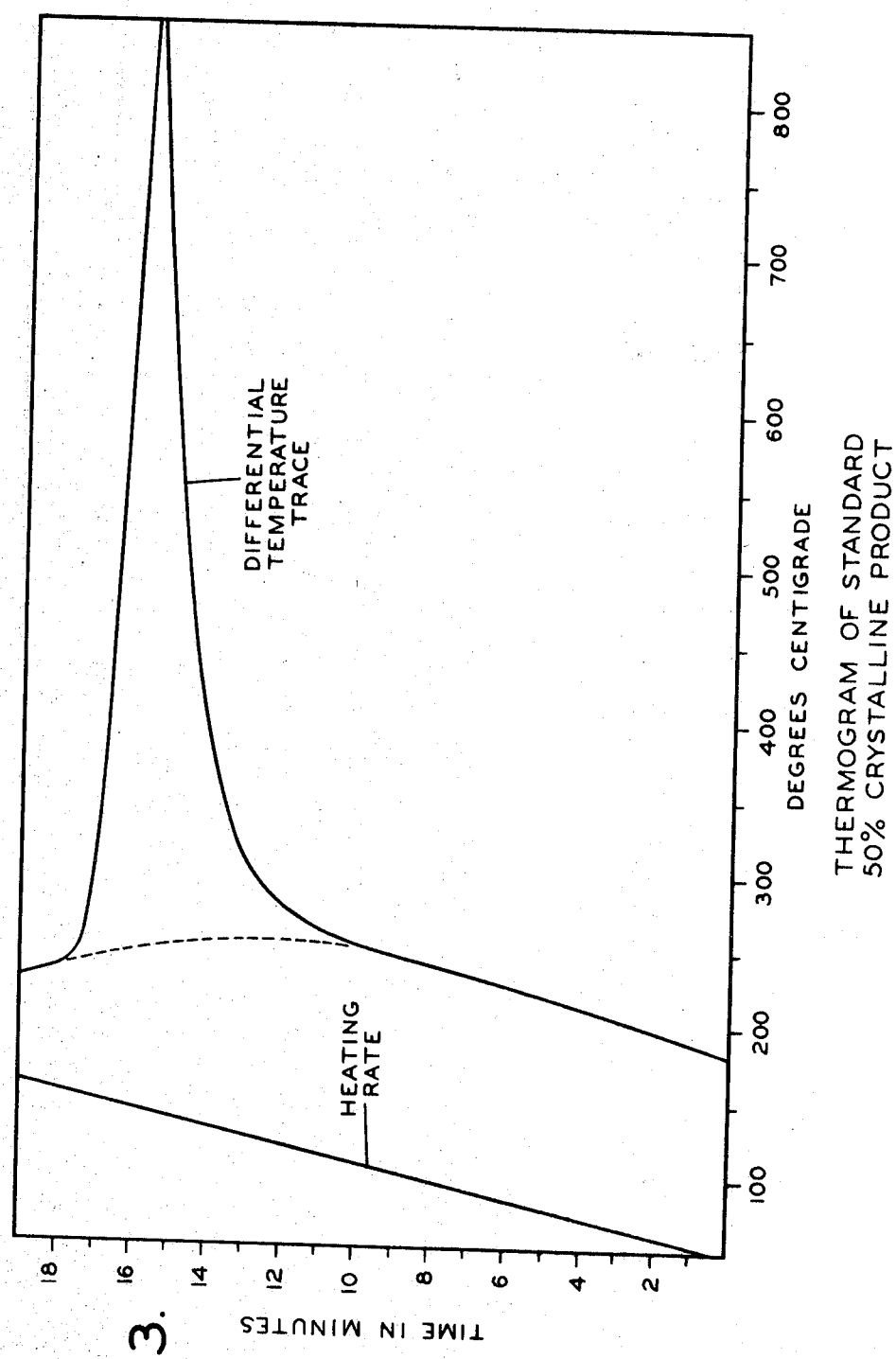

3,563,974
LINEAR POLYETHYLENE CHLORINATION
Carl R. Eckardt, Morris Plains, and William M. Bungo,
Parsippany, N.J., assignors to The Dow Chemical Company, Midland, Mich., a corporation of Delaware
Continuation-in-part of application Ser. No. 354,345,
Mar. 24, 1964. This application May 16, 1968, Ser.
No. 742,107
Int. Cl. C08d 5/04
U.S. Cl. 260—94.9                4 Claims

ABSTRACT OF THE DISCLOSURE

A process for aqueous slurry chlorination of linear polyethylene of molecular weight below 500,000 whereby chlorinated polymer having 30%–50% by weight chlorine content is obtained. By following a specific schedule of reaction temperature vs. chlorine content of the polymer, good production rates are obtained and the resulting chlorinated polymer is fully soluble at room temperatures in aromatic hydrocarbon solvents and is highly flexible at low temperatures.

---

This application is a continuation-in-part of our copending application Ser. No. 354,345 filed Mar. 24, 1964.

This invention relates to process and product wherein a linear polymer of ethylene is chlorinated in aqueous slurry.

Chlorination of polyethylene is broadly known for both conventional branch chain polyethylene and the linear polyethylenes, which linear polyethylenes as is known are characterized by densities of at least 0.935 gram per milliliter at 23° C. and by melting points of at least 125° C. The present invention is more particularly concerned with chlorinating ethylene polymers of densities about 0.94–96 gram per milliliter and melting points in the range between 130° C. and about 140° C.

By the process of Chapman et al. U. S. application Ser. No. 86,309, filed Feb. 1, 1961 (French Pat. 1,316,044) uniformly chlorinated, substantially non-crystalline chlorinated polyethylenes can be produced at good production rates with chlorine contents from about 20%–80% by weight. These products are outstanding in their properties of tensile strength, ultimate elongation, and flexibility for given chlorine content.

These previously known chlorinated polyethylenes of the above Chapman et al. application have relatively high molecular weights as calculated from intrinsic viscosity, due to their being produced from high molecular weight polyethylenes having molecular weights of the order of 400,000–500,000 and higher, i.e. from polyethylenes having intrinsic viscosities in decalin at 135° C. of about 4 dl./gm. and higher. Such relatively high molecular weights tend to make the handling of these products somewhat difficult on plastics working machinery such as calendar rolls, mixing and blending apparatus, etc. The largely amorphous character of these products and the randomness of the chlorine substitution confer partial solubility in the low-priced aromatic solvents such as benzene, toluene and xylene; but the high molecular weight fractions present in the products remain undissolved and thus impair the utility of the products in solution in these solvents. Moreover the relatively high molecular weight imparts impractically high viscosities to solutions of these products at the concentration levels desirable in commercial practice such as 20% solids.

When it is attempted to carry out at good production rates, the aqueous slurry chlorination process of the above Chapman et al. application upon polyethylenes having relatively low molecular weights, difficulties are generally encountered upon elevating the temperature near to the crystalline melting range of the polyethylene feed stock, as required in accordance with the Chapman et al. process. The slurried particles of polymer tend to agglomerate at these elevated temperatures, forming lumps which thereafter become chlorinated mainly near the exterior so that the resulting products are non-uniformly chlorinated; and the lumpy form is unsuitable for use in dry blending operations as commercially practiced. Not infrequently the agglomeration is so severe as to form one huge ball of unmanageable material.

To improve unformity of chlorination and the solubility of the resulting products as compared to products formed entirely at low temperatures, below 100° C., and to reduce agglomeration in aqueous slurry chlorinations, it has been proposed to chlorinate polyethylene to chlorine content of at least 10% at relatively low temperatures below 100°–110° C. for example, and then to gradually increase the temperature to above 100°–110° C. (depending on molecular weight) while continuing the chlorination (British Pat. 882,524; U.S. Pat. 3,227,781 of Jan. 4, 1966 to Klug et al.). Such method of operation is applicable to polyethylenes of moderate as well as high molecular weight; but without the special high-temperature "tipping" step of the present invention, such operations fall far short of achieving the low temperature flexibilities attainable by the process of the above-cited Chapman et al. application, and the resulting products when at chlorine content below about 60% by weight are not fully soluble in the cold in solvents such as toluene. Moreover when a temperature substantially above 110° C is used in these prior operations, such as 115°–120° C., the rate of chlorination tends to be low because agglomeration, easily occurring in such operations, has heretofore been controllable only by using a low pressure and slow uptake of chlorine.

We have now discovered how certain linear polyethylenes of lower molecular weight than the 500,000 level can be uniformly chlorinated in aqueous slurry at good production rates to products with chlorine contents of about 30% by weight up to about 50% by weight, which products are obtained with particle size usable in commercial dry blending; are more readily workable on plastics machinery than the above-cited products of high molecular weight; are substantially fully soluble in the cold in aromatic solvents such as benzene, toluene, and xylene at commercially useful concentrations, such as 15%–20% solids, forming solutions therein of viscosity suitable for casting, coating, spreading, etc. i.e. viscosity of the order of magnitude of 10,000 cps.; have good properties of tensile strength and elongation; and remain easily and highly flexible without plasticizers down to much lower temperatures for given chlorine content than do the heretofore generally known chlorinated polymers of similar molecular weights, prepared by aqueous slurry chlorination.

Our process in essence consists in chlorinating at temperatures in critically selected ranges for given chlorine contents; then accomplishing a final "tipping" of the chlorinated ethylene polymer thus obtained, with from 1% to 15% of chlorine by weight of the final product, at temperatures at least reaching the polyethylene melting point.

The chlorinated polymer thus reacted or "tipped" with chlorine must be produced under controlled conditions of slurry density, chlorination rate and temperature; and must be produced from a starting polyethylene with melting point (i.e. temperature at which the fusion of the crystalline regions is completed) in the range between about 130° C. and about 145° C. and intrinsic viscosity in decalin at 135° C. in the range from about 0.7 to about 3.5 dl./gm. Melting point of the polyethylene can be determined by various known methods such as disappearances of double refraction, differential thermal analysis, etc. The polymers often show a melting range of say 5–10° C. by these methods. The melting point herein referred to is the upper limit of the melting range. Intrinsic viscosity is determined by standard methods involving extrapolation of reduced viscosity to infinite dilution, a suitable procedure being as described in ASTM Test D1601–61.

The products resulting from our process are chloropolymers of ethylene containing about 30%–50% by weight chlorine and having high tensile strength of at least 1000 p.s.i., having exceptional flexibility and extensibility for given chlorine content at temperatures of 25° C. and below; being soluble in the cold (25° C.) to the extent of at least 95% in benzene and toluene; and having intrinsic viscosity in orthodichlorobenzene at 100° C. in the range of about 0.5–3 dl./gm. Solubilities of our products are somewhat dependent on temperature and chlorine content. Our products are fully soluble even at 25° C. in benzene and toluene to at least 20% by weight solids concentration.

A very significant property of polymeric materials, in particular as a measure of their flexibility at given temperature, is the glass transition temperature ($T_G$). The glass transition temperature of our products is not above 25° C. at chlorine contents up to 50% by weight chlorine; not above −5° C. at the chlorine contents up to 40% by weight chlorine; and in the range of −30° C. to −15° C. with chlorine contents of about 30% by weight chlorine.

A characteristic property of these products which is believed to be necessary although not itself entirely sufficient to confer their high solubility in aromatic hydrocarbons and the low values of their glass transition temperatures, is their substantial freedom from crystallinity, the crystallinity being not above 1% as determined by differential thermal analysis. As is known, differential thermal analysis is a technique in which a reference substance and a sample are heated in an insulated zone at a given rate of heat input; and the temperatures of the reference substance and the sample are measured continuously or at frequent intervals. The reference substance is chosen to be inert under the heating conditions used, for example magnesium oxide can be used. Temperature differences which develop between the reference substance and the sample are indicative of physical and/or chemical changes occurring in the sample as it is heated. The fusion of crystalline portions of the sample can be detected by this method; and the percent crystallinity can be quantitatively estimated by comparing the area within a peak corresponding to temperature differences developed during the fusion process, vs. the area at the same temperature corresponding to fusion in a standard sample of known crystallinity. Crystallinity of the chlorinated polymers of ethylene herein cited can be estimated using polyethylene of 50% crystallinity (as determined by X-ray) as standard sample.

FIGS. 1–3, discussed in more detail below, show thermograms of respectively a non-crystalline product of our invention, a 5% crystalline chlorinated polyethylene, and 50% crystalline polyethylene.

Another structural characteristic of our polymers, contributing to their low $T_G$'s and their solubilities is the distribution of the chloro substituents along each molecular chain. By infra-red analysis, it appears the distribution deviates from random in our polymers in favor of short groups of say 2–10 neighboring carbon atoms each substituted by one chlorine atom. Such distribution is indicated by the relative prominence of the absorption band (doublet) at frequency of 1461–1354 cm.$^{-1}$ vs. the doublet at 1446–1436 cm.$^{-1}$ and the singlet at 1427–1423 cm.$^{-1}$ as measured in trichloroethylene solution. The relation is indicated by the accompanying FIG. 4 in which mol fractions of the three types of methylene groups assigned to these frequencies, viz. —$CH_2$—*$CH_2$—$CH_2$—; $CHCl$—*$CH_2$—$CH_2$; —$CHCl$—*$CH_2$—$CHCl$—; are plotted vs. chlorine content of the polymer. The curves labeled $O_1$, $O_2$, $O_3$ represent the distributions of each type as calculated from observed optical densities in products such as produced by our process; and the curves labeled $P_1$, $P_2$, $P_3$ are the corresponding curves calculated for fully random substitution of linear polyethylene by chlorine.

A factor in the solubilities observed for our products is their freedom from molecules of much lower chlorine content than the average; i.e. their satisfactory uniformity of chlorination, not always obtained by other procedures.

The polyethylene starting material for our process will complete its fusion within a range reaching at least 130° C., this polyethylene accordingly being a relatively high melting linear polyethylene. Such starting polyethylene allows good production rates by minimizing agglomeration which tends to occur at our high production rates when lower melting linear polyethylene is used. In our preferred operations this polyethylene, in the form of small particles all passing through about 20 mesh, is slurried in water at solids concentration in the slurry not above 20% by weight and preferably about 5%–15% by weight. Use of higher initial slurry densities is desirable to obtain high production from the apparatus, but we have found that when the solids concentration in the slurry is too high, agglomeration occurs notwithstanding that other conditions of our process are properly controlled.

The hourly rate of supplying chlorine in the slurry which can be employed is related to the slurry density, higher slurry densities generally imposing initially lower maxima upon the rate of supplying chlorine. Suitable hourly rates of supplying and reacting chlorine at the start of the chlorination to avoid agglomeration when utilizing a high melting linear polyethylene in accordance with our invention, are from about 0.1 lb. to about 0.5 lb. chlorine per pound of starting polyethylene. Then when the chlorine content of the product has reached about 10% by weight, the hourly rate of supplying and reacting chlorine can, under adequate cooling conditions, be increased without causing agglomeration, to as high as 10 lbs. per pound of polyethylene starting material. Such increase in rate produces heat at a correspondingly increased rate, so that a corresponding cooling of the reaction mixture will commonly be needed to maintain temperatures at the desired levels. Until the polyethylene reaches at least about 3% chlorine content, the rate of supplying chlorine should be limited so as to maintain the chlorine partial pressure in the gas phase at not above 1 atm. absolute.

The temperature at which chlorination is effected is an important factor in success of our process. The chlorination must be carried out at temperatures which start suitably at about 100° C., then rise into the range 115–120° C. and remain there for a substantial part of the chlorination. Starting temperatures lower than 100° C. can be employed to give similar results but may require longer reaction times so that they offer no advantage.

When the chlorine content of the chlorinated polymer in the aqueous slurry maintained at 115–120° C. has reached a level not more than 15% by weight from the desired final chlorine content and at least 1% by weight from this final chlorine content, the critical step of tipping with chlorine at elevated temperature above the polyethylene melting point is performed. The temperature of the slurry is brought to and completely through the melting range of the polyethylene starting material, and is brought usually within about 5° C. above the upper limit of the melting range of the polyethylene starting material but not above 145°C. The chlorination is then conducted in this elevated temperature range to obtain the desired tipping with 1%–15% of combined chlorine.

Reference has been made in the foregoing to crystallinities of chloropolymers of ethylene as determined by differential thermal analysis. In the accompanying drawings, typical thermograms are shown for chloropolyethylenes, together with a thermogram for polyethylene which is used as a standard to compute crystallinities.

FIG. 1 shows a typical thermogram of a chloropolymer of this invention, having substantially zero crystallinity as determined by substantial absence of an endothermal differential thermal analysis peak in the melting range of the parent polymer of ethylene (about 125°–135° C.). Temperature is shown along the horizontal axis in ° C. and time in minutes along the vertical axis. The straight line at the left of the figure represents a plot in these coordinates of the steady heating up of the reference substance (MgO) at rate of 5° C. per minute from about 50° C. to about 150° C. The gently curved line at the right of the figure is traced by a pen which is coupled with the output from a thermocouple measuring the reference temperature and with the output from a thermocouple measuring the sample temperature. Any differential increase in temperature of the reference vs. the sample causes the pen to move proportionately to the right. Such trace accordingly represents an endothermal process occurring in the sample, starting at the temperature where the rightward break occurs. When such process is complete, the pen moves back to the left until the reference and sample are at the same temperature and the pen resumes its original course. The apex of the peak thus formed will be at or above the maximum temperature at which the endothermal process takes place. The area under the peak is proportional to the heat absorbed in the endothermal process. (The temperature coordinates in the figure apply only to the left hand, heating rate line and not to the trace at the right of the figure.)

FIG. 3 shows the thermogram of a polyethylene typical of the polyethylene starting materials employed for this invention, heat treated to produce polyethylene crystallinity of 50% as measured by X-ray analysis. This polyethylene is more fully described in Example I below.

Figure 2:
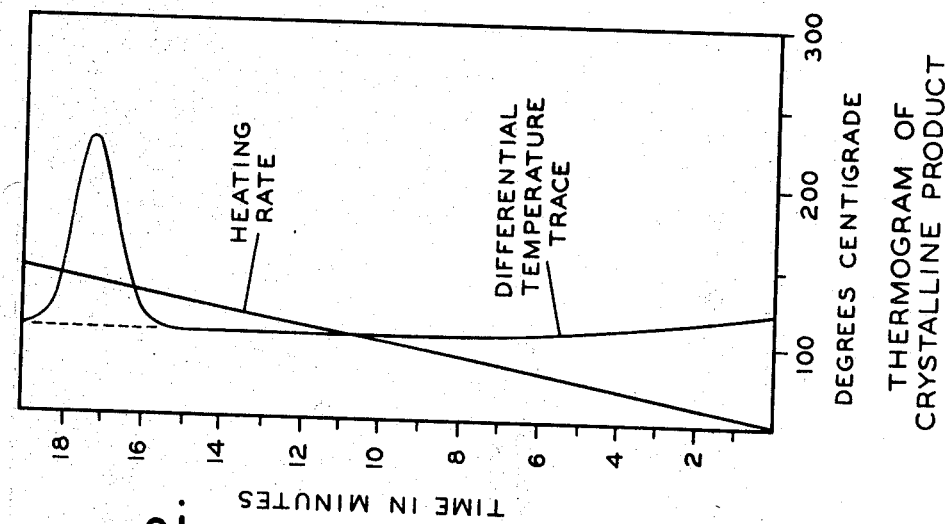
FIG. 2 shows a typical thermogram of a chloropolymer of ethylene product without the tipping step of this invention, having an endothermal differential thermal analysis peak corresponding to about 5% crystallinity.
Figure 1:
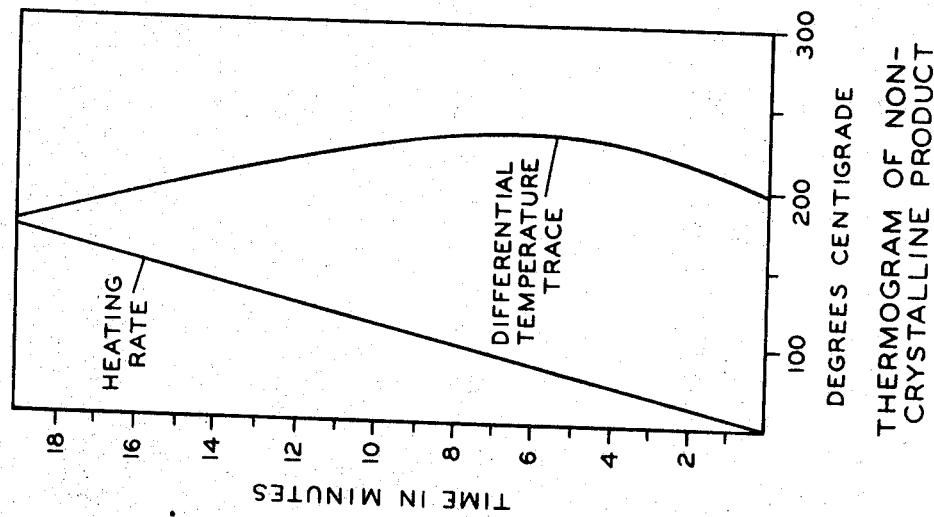

To determine the crystallinity of a given chloropolypropylene, its thermogram is examined in the region where the polymer sample has been heated to about the melting range of the parent polyethylene; and the area enclosed, between any peak and the interpolated curve to be expected if there were no peak, is determined. In FIGS. 2 and 3 this interpolated curve is shown by a broken line across the base of the endothermal peak. The area within the peak is then compared with the corresponding area for the standard polyethylene sample of 50% crystallinity; the crystallinities of the sample under study and the standard are in the same proportion as the areas under the endothermal differential thermal analysis peaks.

Glass transition temperatures referred to herein represent the temperature at which a standard torsional stiffness of the sample is reached. They are determined by use of torsional wire apparatus as described in ASTM Test D–1053–61, using methanol as cooling liquid. The glass transition temperature is taken as that temperature at which the torsional modulus of rigidity determined by this ASTM test has the value $1.45 \times 10^4$ p.s.i. These glass transition temperatures are considerably above the brittleness or flex temperature of the polymer as measured by the usual impact tests such as ASTM Test D–746–57T, being generally at least 45° C. higher than the brittleness or flex temperature.

Tensile properties, i.e. tensile strength, yield strength, elongation and tensile modulus cited in the examples and tables which follow, are determined at rate of 2 in./min. in accordance with ASTM Test D–638–61T using die "C" of ASTM Test D–412–62T. Tensile impact strength is determined by swinging pendulum per ASTM Test D–1822–61T.

The examples which follow are specific embodiments of our invention illustrative of the best mode contemplated by us for carrying out the invention; but the invention is not to be interpreted to be limited to all details of the examples.

EXAMPLE 1

A jacketed reactor provided with means of agitation, gas feed lines with flowmeter, pressure recording instrument, thermowells and appropriate valves and piping was charged with 65,000 lbs. of deionized water and 6000 lbs. of polyethylene having an intrinsic viscosity of about 1.95 dl./gm. as determined in decalin at 135° C. by extrapolation to infinite dilution from a concentration of 0.3 gm./100 ml. of solvent; average molecular weight of about 150,000 as calculated from the intrinsic viscosity; and a melt index of about 0.2 gram per 10 minutes according to ASTM Test D–1238–62T, condition "E," i.e. 190° C. and 2160 gm. load. The formula used for calculating molecular weight is:

$$n_i = 6.77 \times 10^{-4} M^{0.67}$$

wherein $n_i$ is intrinsic viscosity and M is molecular weight.

The polyethylene was prepared by polymerizing ethylene in gas phase using silica gel-supported magnesium dichromate together with aluminum triisobutyl as catalyst in accordance with British Pat. 858,674, Example 6. The silica gel support had average pore volume about 1 cc. per gram and surface area about 350 sq. meters per gram. The polyethylene resulting, having intrinsic viscosity in Decalin at 135° C. of about 9, was then supplied to an extruder under an atmosphere of inert gas and heated therein under conditions of high shear at temperatures of about 400°–500° C. whereby the molecular weight was reduced and the extrudability was brought from immeasurably low melt index for the original polymer, up to about 1 in the starting polymer used in this example. This starting polymer was linear as indicated by its density of about 0.94 gm./ml. at 23° C. and its melting range as determined by differential thermal analysis, which was from about 125° C. to an upper limit of about 135° C. (See FIG. 3. A small fraction appears to melt or soften as low as about 110° C.)

The polyethylene charged was of such particle size that 100 percent passed through 50 mesh standard sieve screen.

The charged reactor was thoroughly purged by nitrogen. Chlorine was then introduced through the top of the reactor into the gas phase at an hourly rate of about 0.2 lb. of chlorine per lb. of polyethylene at an initial reaction mixture temperature of 100° C.; and chlorination was continued at hourly chlorine feed rate in the range about 0.2 lb. per lb. polyethylene regulated to allow temperature to rise as chlorine reacted, and to reach 115° C. when 10 percent by weight of chlorine had been introduced into the polymer. Chlorination was continued at a rate in the said range maintaining 115° C. until chlorine content of the product was 30 wgt. percent.

Then the temperature of the reaction mixture was increased to 140° C. during which period no chlorine was added to the reactor; and at 140° C. the product was "tipped" with chlorine at a feed rate of about 0.15 lb. chlorine per lb. polyethylene, maintaining the temperature of the reaction mixture at 140° C., until the final product contained about 40 percent by weight of chlorine. Throughout the chlorination period, the reactor was operated under full pressure (maximum about 50 p.s.i.g.) without venting, so that whenever the reaction rate fell below the rate of supplying chlorine, the pressure of chlorine in the gas phase rose and restored the rate of chlorine uptake to equal the supply rate.

The above temperature schedule was based on chlorine supplied, one-half of which was calculated as combined with the polymer.

The polymer was removed from the slurry and given multiple extractions with water at 50°–60° C. until the extracts were neutral. The product was dried in a hot air drier at 55° C. under vacuum.

The product was of fine particle size suitable for dry blending, ⅛ inch maximum diameter. It had an intrinsic viscosity of about 1.4 dl./gm. as measured in o-dichlorobenzene at 100° C., a glass transition temperature of about −14° C. determined by the above cited stiffness tests, and 0% crystallinity according to the above outlined DTA test procedure.

This product was soluble to the extent of at least 98% in toluene at 25° C. and 20% solids concentration, forming a solution of viscosity about 16,500 c.p.s., useful for casting, spreading and coating operations as in lacquer coatings. The present coatings are characterized by their easy and high flexibility at ordinary temperatures and at temperatures well below 0° C.

EXAMPLE 2

Essentially the polyethylene and procedure of Example 1 was used. A pilot plant size vessel (20 gallons) was employed and hourly feed rate of 0.358 lb. chlorine per lb. polyethylene was maintained throughout the run. The purge of the reactor was effected by boiling off about 10% of the water charged, instead of by nitrogen. The polymer was brought first to 10 weight percent chlorine, then at 115° C. to 17 weight percent. The temperature was then increased to 140° C. with continued chlorination bringing the chlorine content of the polymer to about 23% by weight. The resulting product was then tipped, at 240° C., with chlorine to increase the chlorine content by about 7% by weight.

The recovered product had particle size about 1/16 inch. It showed 30.4% by weight chlorine by analysis. Its intrinsic viscosity was 1.27 dl./gm. in o-dichlorobenzene at 100° C. The glass transition temperature was −28° C.; and the product had less than 1% crystallinity, as indicated by absence of an endothermal differential thermal analysis peak at about the 135° C. melting point of the polyethylene starting material.

In the standard tensile tests, this product had tensile strength of about 1300 p.s.i. and elongation of about 950%.

The hourly chlorine supply rate was kept constant in the above examples, but it is also permissible and in some instances desirable to increase this rate, particularly during the "tipping" step of our process whereby the time at elevated temperature is shortened. Such procedure can be used in the operations of Examples 1 and 2 above, employing hourly chlorine supply rate, while tipping the product at 140° C., of 0.5 lb. chlorine per lb. of polyethylene starting material. The lower rates of chlorination are especially required when starting the process upon unchlorinated polyethylene, since the unchlorinated material tends to float on the water instead of being dispersed. Unduly high rates of supplying chlorine under these conditions may produce agglomeration. Once the polyethylene is chlorinated to content of about 3%–5% of chlorine by weight, the product becomes wettable by the slurry and more easily dispersible, and chlorination rates can be raised above the limits required initially. The chlorine supply rates used while the starting polyethylene is being chlorinated up to about 3% chlorine content in general should provide a chlorine partial pressure in the gas phase not above 1 atmosphere absolute; which pressure limitation provides a guide for setting initial chlorine supply rates.

Table I which follows outlines preferred temperature schedules vs. chlorine content of product, to be used in accordance with our invention to produce our chloro linear polymers of ethylene at final chlorine contents of 30%–50% by weight. Table II outlines typical properties of these products.

All of the products of our process set forth in Table II have crystallinities by differential thermal analysis of less than 1%; and are at least 98% soluble in toluene at 25° C. and at 20% solids concentration, after milling for about 15 minutes whereby a temperature of about 100° C. develops and any gel particles subject to breakdown by such milling are reduced to microgels.

Two comparison products are shown in Table II, both produced essentially by the procedure of Example 2 above except that comparison Product "A" was produced entirely at 100° C.; and comparison Product "B" was produced without a "tipping" step, at maximum temperature of 120° C. It will be observed that comparison "A" is irregular in its elasticity as seen in its variable elongation; and both comparison products have substantial crystallinity.

A third comparison product was made from polyethylene as in Example 2 by the same procedure as was used in Example 2 above except as temperatures reaching 120° C. as chlorine content rose from 17% to 23% and then remaining at 120° C. to final chlorine content of 40.1% chlorine by weight. This product had glass transition temperature of +15° C. and showed about 5% crystallinity by DTA (differential thermal analysis). After milling as above (15 minutes, 100° C.) only about 50% of this product was soluble in benzene at room temperature and solids content of 10%. Because of the large insoluble fraction, this product is unsuited for general practical use in solution form in benzene, toluene, xylene and like aromatic hydrocarbon solvents. Apparently crystallinity is present in about half the molecules of this polymer, making these molecules insoluble in aromatic solvents.

Use of "tipping" temperatures above 120° C. is accordingly essential in our process; but we have found that undesirable agglomeration occurs if the temperatures required for "tipping" are utilized too soon; i.e. if more than at most the last 15% of the chlorine content (by weight of the product) is combined therein at "tipping" temperatures.

A further condition necessary in operating our process, to confer the desired flexibility and solubility upon products of 30%–50% chlorine content, is that temperatures used reach at least 115° C. by the time that the chlorine content of the product has reached about 10% by weight. Otherwise, although upon "tipping" above the polyethylene melting point an amorphous product is obtained at e.g. 40% chlorine content, this product lacks full solubility in cold toluene.

Thus it is critical in our process to bring the temperature to 115° C.–120° C. as the chlorine content rises to about 10%; to maintain temperature in the range 115° C.–120° C. during a substantial portion of the chlorination; and to finish the chlorination by "tipping" at a still more elevated temperature reaching at least 130° C., this being a minimum for the starting polyethylene point of complete fusion (melting point). By thus operating it is possible to maintain chlorine hourly feed rates and hourly reaction rates at a level of at least 0.1 lb. chlorine per pound of starting polyethylene and to obtain polymer with 30%–50% by weight chlorine content which is flexible at low temperatures and fully soluble in the cold in toluene at 20% solids content.

So far as we are aware, no aqueous slurry chlorination process proposed before our invention is capable of achieving such solubilities, until the chlorine content reaches about 60% by weight, nor capable of achieving the low temperature flexibilities realized by our process at 30%–50% chlorine content; at least when operating at good production rates such that the chlorine reacted is at least 0.1 lb. per pound of starting polyethylene per hour (i.e. about 0.05 lb. of chlorine combined per hour with each pound of starting polyethylene, the remaining chlorine forming hydrogen chloride).

In our process we have found it best to perform the tipping with chlorine as the final step. However it will be possible in some circumstances to perform the tipping at an intermediate chlorine content and then finish the chlorination at a temperature below the polyethylene melting point; or to chlorinate alternately at temperatures above the polyethylene melting point and at lower temperatures, so as to accomplish the desired tipping with chlorine in stages. All such variants of our process are to be understood as included within the scope of our claims.

in the aforesaid 0.1 lb.–10 lbs. range to tip the chlorinated polymer at said melting temperature with from 1% to 15% of chemically combined chlorine by weight of the final product and bring the final chlorine content thereof to the range of 30%–50% by weight.

TABLE I

| Polyethylene: | | | | | | | | | | | | |
|---|---|---|---|---|---|---|---|---|---|---|---|---|
| Intrinsic viscosity dl./gm | 2.4 | | | | 1.95 | | | | 1.5 | | | |
| Melting point ° C | 135 | | | | 135 | | | | 135 | | | |
| Temperatures ° C | 100–115 | 115 | 115–140 | 140 | 100–115 | 115 | 115–140 | 140 | 100–115 | 115 | 115–140 | 140 |
| Total weight percent chlorine in product | 10 | 17 | 20 | 25 | 10 | 17 | 20 | 25 | 10 | 20 | 23 | 25 |
| | 10 | 17 | 23 | 30 | 10 | 17 | 23 | 30 | 10 | 24 | 26 | 30 |
| | 10 | 25 | 28 | 35 | 10 | 22 | 25 | 35 | 10 | 25 | 30 | 35 |
| | 10 | 30 | 33 | 40 | 10 | 34 | 36 | 40 | 10 | 34 | 36 | 40 |
| | 10 | 35 | 39 | 45 | 10 | 40 | 42 | 45 | 10 | 40 | 42 | 45 |
| | 10 | 39 | 41 | 50 | 10 | 45 | 47 | 50 | 10 | 42 | 46 | 50 |
| | 10 | 43 | 46 | 55 | 49 | 49 | 51 | 55 | 10 | 52 | 53 | 55 |
| | 10 | 43 | 46 | 60 | 49 | 49 | 51 | 60 | 10 | 55 | 57 | 60 |

TABLE II.—PROPERTIES OF NON-CRYSTALLINE CHLORO LINEAR POLYETHYLENES

| Percent Cl in product | Polyethylene intrinsic viscosity, dl./gm. (Decalin 135° C.) | Intrinsic viscosity o-dichlorobenzene, 100° C. | Glass transition temp.,° C. | Tensile strength, p.s.i. | Yield strength, p.s.i. | Elongation, percent | 1% secant tensile modulus, p.s.i. | Tensile impact strength, ft. lbs./in.² |
|---|---|---|---|---|---|---|---|---|
| 30 | 1.95 | 1.27 | −28 | 1,300 | 270 | 950 | ,000 | 246 |
| 40 | 2.4 | 2.1 | −17 | 2,000 | 130 | 460 | 1,360 | 380 |
| 40 | 1.95 | 1.4 | −14 | 1,400 | 160 | 480 | 514 | 226 |
| 40 | 1.5 | 1.2 | −14 | 2,300 | 140 | 570 | 533 | 550 |
| 50 | 2.4 | 1.7 | +3 | 1,500 | 740 | 285 | 21,200 | 220 |
| 50 | 1.95 | 1.5 | +8 | 8,600 | 160 | 285 | 112,000 | 200 |
| COMPARISON PRODUCT "A" (21% CRYSTALLINE BY DTA, PRODUCED AT 100° C., ANNEALED) | | | | | | | | |
| 40 | 1.5 | 1.0 | +37 | 3,200 | 5,100 | 38–225 | | 19 |
| COMPARISON PRODUCT "B" (9% CRYSTALLINE BY DTA, PRODUCED AT 100° C.–120° C., ANNEALED) | | | | | | | | |
| 40 | 4.1 | 2.5 | +3 | 3,600 | (¹) | 325–340 | | 191 |

¹ No yield point.

We claim:
1. In a process for chlorinating a linear polymer of ethylene in aqueous slurry to obtain a highly extensible, amorphous chlorinated linear polymer of ethylene having 30%–50% by weight chlorine content, the improvement making said polymer fully soluble in aromatic hydrocarbon solvents and highly flexible at low temperatures which comprises: forming an aqueous slurry of chlorinated linear polymer of ethylene by contacting the aforesaid linear polymer of ethylene in particle form with chlorine in aqueous slurry of solids concentration not above 20% by weight and at hourly rate of supplying chlorine in the slurry between 0.1 lb. and 0.5 lb. of chlorine per lb. of polyethylene starting material, and at temperatures below the polyethylene melting point, rising from 100° C. as a starting temperature to 115° C.–120° C. as the chlorine content of the polymer rises from 0% to 10% by weight; said polyethylene starting material having melting point between 130° C. and 145° C. and intrinsic viscosity in Decalin at 135° C. in the range from about .7 to about 3.5 dl./gm.; maintaining said 115° C.–120° C. temperatures and supplying chlorine for chlorination of the polyethylene at hourly rate between 0.1 lb. and 10 lbs. per lb. starting polyethylene; then elevating the temperature of the resulting slurry to at least the melting point of said polyethylene starting material but not above 145° C.; and then contacting and reacting the resulting chlorinated polymer in aqueous slurry with chlorine supplied at rates

2. Process of claim 1 wherein the temperature at which the chlorinated polymer is tipped with chlorine is within 5° C. above the melting point of the polyethylene.

3. Process of claim 2 wherein the polyethylene starting material has intrinsic viscosity in the range from about .7–1.7 dl./gm. and wherein the amount of chlorine reacted and chemically combined with the chlorinated polymer to tip it at temperature above the polyethylene melting point is correlated with the chlorine content of the final product, and increases with increasing final chlorine content from about 2% to about 5% of the final product as final chlorine content increases from about 25% to about 40% by weight.

4. Process of claim 2 wherein the initial solids concentration in the aqueous slurry is about 5%–10%.

References Cited

UNITED STATES PATENTS 3,227,781  1/1966  Klug et al. _____ 260—94.9X

FOREIGN PATENTS 882,524  11/1961  Great Britain _____ 260—94.9

JOSEPH L. SCHOFER, Primary Examiner

W. F. HAMROCK, Assistant Examiner

U.S. Cl. X.R.

260—96

PO-1050
(5/69)

UNITED STATES PATENT OFFICE
CERTIFICATE OF CORRECTION

Patent No. 3,563,974　　　　　　　　Dated 16 February 1971

Inventor(s) Carl R. Eckardt, William M. Bungo

It is certified that error appears in the above-identified patent and that said Letters Patent are hereby corrected as shown below:

In column 1, line 37, change "96" to -- 0.96 --.

In column 3, line 69, change "1354" to -- 1454 --.

In column 7, line 28, change "240°" to -- 140° --.

In column 9, Table II, under the column headed 1% secant tensile modulus, p.s.i., change the first number from ",000" to -- 1,000 --.

Signed and sealed this 10th day of August 1971.

(SEAL)
Attest:

EDWARD M. FLETCHER, JR.　　　　　　　　WILLIAM E. SCHUYLER,
Attesting Officer　　　　　　　　　　　　Commissioner of Paten